UNITED STATES PATENT OFFICE.

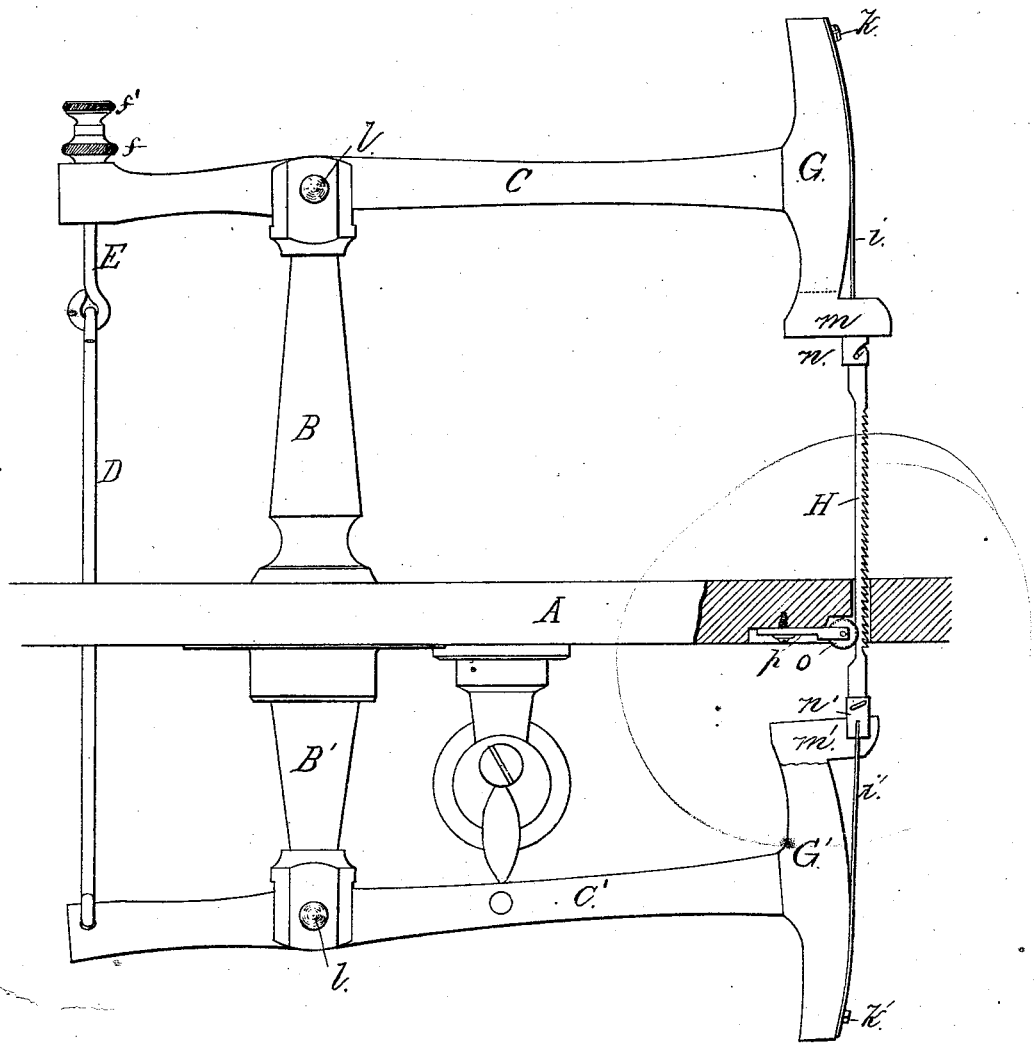

EDWIN J. WESCOTT, OF HYDE PARK, ASSIGNOR TO P. R. TRIPP, OF BOSTON, MASSACHUSETTS.

IMPROVEMENT IN JIG-SAWS.

Specification forming part of Letters Patent No. 160,043, dated February 23, 1875; application filed September 9, 1874.

*To all whom it may concern:*

Be it known that I, EDWIN J. WESCOTT, of Hyde Park, in the county of Norfolk and State of Massachusetts, have invented an Improvement in Jig-Saws; and I do hereby declare that the following, taken in connection with the drawings which accompany and form part of this specification, is a description of my invention sufficient to enable those skilled in the art to practice it.

The object of this invention is to insure a perfectly straight movement of the saw or other implement in the same right line while dispensing with the cumbersome and heavy reciprocating frames to which such saws are usually secured, the saw in my improvement being connected above and below the table to spring-links, each of which is connected to levers or working beams, whose ends to which the links are attached are segmental pieces, or curved in the arc of a circle, described, respectively, from the fulcrums of these levers.

In the drawing, A is the bed or table, partly in section; B B′, an upright and a hanger, on which, respectively, are fulcrumed the levers or working beams C C′. D is a connecting-rod, by which these beams are connected at one end by means of the hook E, the latter having provision, by means of the adjusting-nut $f$ and lock-nut $f'$, for tightening or loosening the saw at option. G G′ are the arched or segmental ends of the levers, the forward faces of which are the points from which the saw is hung, and by which it is always compelled to move in the same right line, notwithstanding the vibrations or oscillations of the lever. The saw H is connected or hung at each end to the end of a flat plate-spring link, $i$ $i'$. The other ends of these spring-links are severally secured, as seen at $k$ $k'$, to the outer ends of the flat curved faces of the segmental parts G G′, whereby, in any and every position of these levers during their movements, their points of contact with the arches must necessarily be always the same distance from the fulcrums, and hence the saw must of necessity reciprocate in the same right line, and is also prevented from twisting. The arcs G G′ have each, preferably, projecting guide-wings or ears $m$ $m'$, between which the square heads $n$ $n'$ on the springs, and to which the saw is fastened, are steadily held, preventing lateral play, and also preventing twisting. A grooved friction-roller, $o$, held by a plate, $p$, secured to the under side of the table, and against which the back edge of the saw may ride, serves to brace the latter, that it may the better resist the push of the material fed to the saw.

It will now be evident that my novel devices may be applied to any tool or instrument whose movements or reciprocations are required to be in the same right line.

The saw is hung by a cross-pin in an inclined slot in the square head $n$, so that it can instantly be hung or unhung, and without any screws or nuts for this purpose.

I claim—

The guide wings or arms $m$ $m'$ on the arcs of the levers, combined with the heads $n$ $n'$ on the springs, and with the guide-roller $o$ for the back edge of the saw, substantially as shown and described.

Executed this 4th day of August, A. D. 1874.

EDWIN J. WESCOTT.

Witnesses:
M. W. FROTHINGHAM,
S. B. KIDDER.